April 30, 1929.  H. CAMINEZ  1,711,260
CAM CONSTRUCTION FOR CAM ENGINES
Filed Nov. 16, 1925
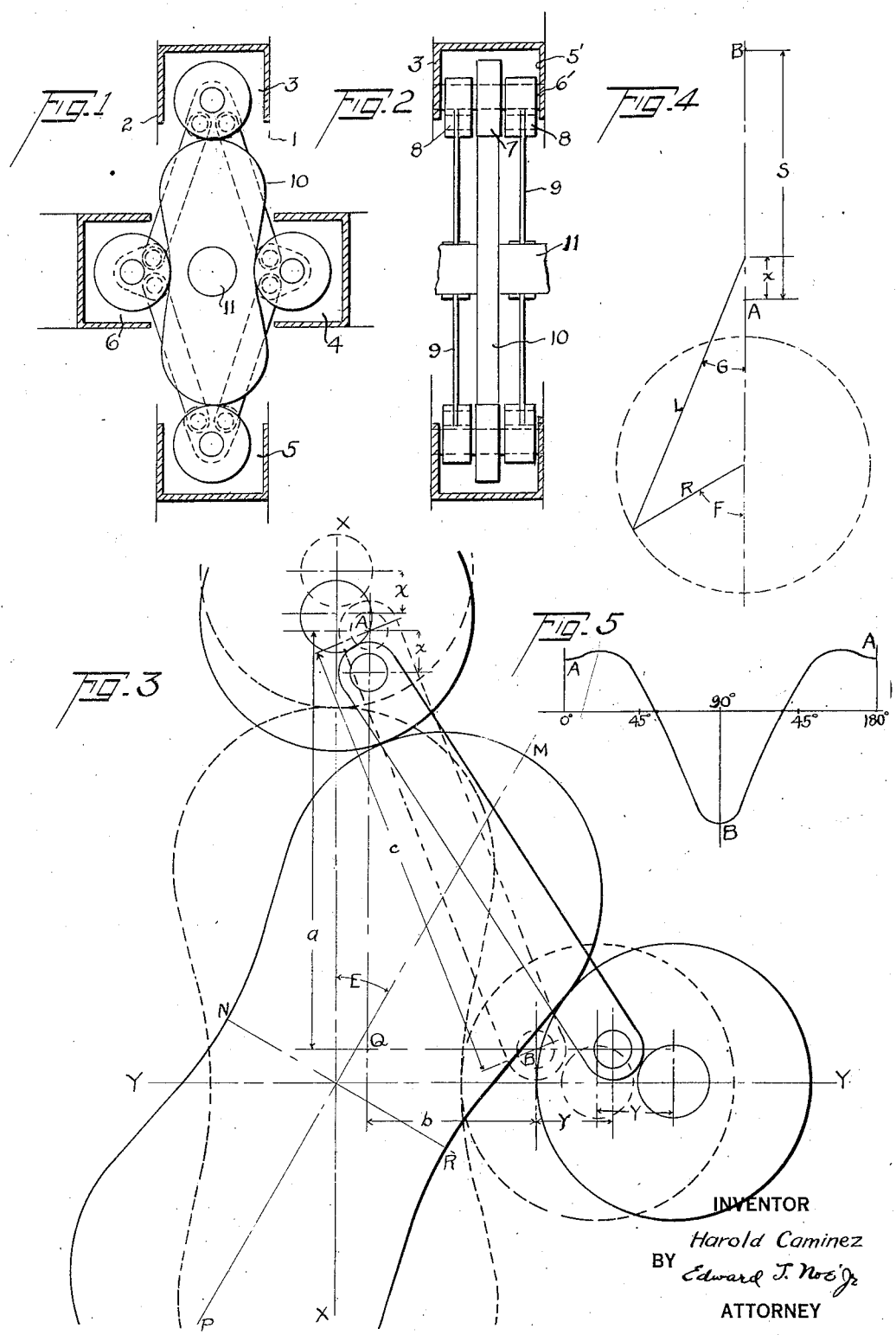
INVENTOR
Harold Caminez
BY Edward J. Noe Jr.
ATTORNEY Patented Apr. 30, 1929.

1,711,260

UNITED STATES PATENT OFFICE.

HAROLD CAMINEZ, OF DAYTON, OHIO, ASSIGNOR TO FAIRCHILD-CAMINEZ ENGINE CORPORATION, OF NEW YORK, N. Y., A CORPORATION OF NEW YORK.

CAM CONSTRUCTION FOR CAM ENGINES.

Application filed November 16, 1925. Serial No. 69,436.

This invention relates to cam engines in which the explosive force in radially arranged cylinders operates upon a central cam so as to cause revolution of the drive shaft, the pistons in the cylinders being interconnected by links so as to maintain a bearing relation with the cam.

It is the primary object of this invention to provide a cam which will cause smooth operation of the engine and which will have a peripheral shape so as to produce gradual changes in acceleration of the pistons throughout the entire cycle of operation.

A further object of the invention is to provide a cam for engines of this character so that the acceleration of the pistons in their strokes is substantially the same as in a crank motion.

A further object is the provision of an unsymmetrical cam in which diagonally opposite quadrants are of symmetrical form while adjacent quadrants are of different shape; the form of one of the quadrants being determined in accordance with the desired acceleration of a piston while the adjacent unsymmetrical quadrant is determined from the link motion which interconnects the pistons so that the rollers in the piston assemblies will be maintained in engagement with the cam throughout the whole cycle of operation.

A further object is the provision of a cam which will be so designed that the outward inertia force of a piston at the outer end of its stroke due to its accelerated movement exists through more than 90° of rotation of the cam so that the acceleration curve of the piston is without abrupt change and so that the links which interconnect the pistons will be caused to operate under tension at all times, thus enabling links of small size and light weight to be used, since the load which they must carry may be determined.

A further object of the invention is the provision of a method of designing the cam so that the above mentioned features may be incorporated.

Further objects and advantages of the invention will be more fully set forth in the following description and claims.

In the drawings

Fig. 1 is a central vertical section through the engine showing its principal parts.

Fig. 2 is a central vertical section through the engine shown in Fig. 1.

Fig. 3 is a schematic showing of the details of construction.

Fig. 4 is a diagrammatic representation of a crank mechanism from which the acceleration curve is computed, and Fig. 5 is an acceleration curve of the cam engine.

Referring more particularly to the drawings by numbers and characters of reference, 1 indicates a four-cylinder, four-cycle internal combustion engine, having radially arranged cylinders 2 in which the piston assemblies 3, 4, 5, and 6 operate. Each piston assembly is composed of a piston 5', piston pin 6', roller bearing 7 and a pair of stress equalizing members 8, 8. The equalizing members 8 are mounted upon the piston pin on each side of the roller bearing so that they may oscillate about the piston pin axis. The equalizing members of the various pistons are interconnected by means of the link members 9, as shown so that the outward movement of one piston controls the inward movement of adjacent pistons.

The roller bearings 7 engage with the periphery of the cam 10 and are constrained to operate in engagement therewith by means of the links and equalizing members. The cam 10 is fixed upon a central shaft 11 which is connected to the drive shaft of the engine. The cam 10 has two lobes as shown so that each revolution of the cam corresponds to a complete cycle of operation of a piston.

The links 9, due to the shape of the cam, operate under tension at all times and the tension in the links is equalized by the equalizing members 8 which prevent the force in one piston from producing side pressure of adjacent pistons in their cylinders.

The method of determining the piston motion and the shape of the cam is illustrated in Fig. 3. Referring to this figure, side M.N. of the cam is identical with the side P.R., and side R.M. is identical with the side N.P. The contour of one set of cam sides is chosen to give the desired motion of the piston. The contour of the other set of diagonally opposite sides is determined from the first set by the links employed. It will be noted that opposed pistons have identical motion, velocity, and acceleration with respect to the engine axis. The inertia forces are therefore completely balanced.

Fig. 3 shows the cam turned an angle E in full lines, from the dead center position indicated in dotted lines. The upper piston has moved a distance $x$ and the horizontal piston a distance $-y$ from their original positions. The link pin A moves along the line QA, and the link pin B along the line QB. At dead center position pin A is a distance $a$ from Q and pin B is a distance $b$ from Q. If $s$ is the length of a piston stroke, $c$ the length of a connecting link 9, $x$ the travel of piston with pin A from top center and $-y$ the travel of piston B from bottom center, then the following equations will be obvious:

$$a - b = s$$
$$(2) \quad a^2 + b^2 = c^2$$
$$(3) \quad (a-x)^2 + (b-y)^2 = c^2$$

$y$ is taken as negative to denote motion away from the cam center.

The relation between the piston motion of adjacent cylinders from Equation 3 may be written as follows:—

$$(4) \quad -y = b - \sqrt{c^2 - (a-x)^2}$$

Differentiating Equation 3 gives the relation between the velocities of the pistons in adjacent cylinders:—

$$(5) \quad -2(a-x)dx - 2(b-y)dy = 0.$$
$$(6) \quad -dy = \frac{a-x}{b-y} dx$$

Differentiating Equation 5 gives the relation between the accelerations of the pistons in adjacent cylinders:—

$$-(a-x)d^2x + dx^2 - (b-y)d^2y + dy^2 = 0.$$
$$(7) \quad -d^2y = \frac{a-x}{b-y} d^2x - \frac{(b-y)^2 + (a-x)^2}{(b-y)^3} dx^2$$

Any type of motion, within limits, can be assigned to piston A. The motion of B is complementary to A, the relations between the piston motions being determined by the preceding equations.

The motion of the piston when moving from one quadrant of the cam to the next quadrant should blend evenly and should undergo no sudden change in acceleration. If this were not true the links 9 would be obliged to take unusually large stresses and wear and vibration would be large. The curvature of the cam surface is therefore chosen so that the motion of the piston results in an acceleration of piston with pin A when $x=0$ equal to the acceleration of piston with pin B when $-y=s$, or an acceleration of piston A when $x=s$ equal to the acceleration of piston B when $-y=0$.

The successive positions of a piston being determined at different angular positions of the cam, the various circles representing the different positions of the contact roller, when properly located about a fixed center in the proper relative angular settings, determines the cam shape. The cam outline is drawn tangent to the various circles, thus determining the exact cam shape, allowing for the diameter of the roller.

When $x=0$ then $-y=0$.

$$dx_o = 0 \; dy_o = 0.$$

Therefore $d^2y_o = -\left(\frac{a}{b}\right)d^2x_o$ (substituting in Equation 7).

When $x=s$ then $-y=s$ $$dx_s = 0 \text{ and } dy_s = 0.$$

Therefore $d^2y_s = -\left(\frac{b}{a}\right)d^2x_s$ (substituting in Equation 7).

$$(8) \quad d^2x_s = -\left(\frac{a}{b}\right)d^2x_o$$

Equation (8) can be fulfilled by choosing such a curvature to side MN of the cam that the motion of the piston will be identical to that produced by a crank mechanism like that shown in Figure 4 when the cam is rotated from the position where the roller is in contact at point M to the position where it is in contact at point N. When the roller is in contact with the cam at point M, Figure 3, the piston will be at point B, Figure 4. When the roller is in contact with the cam at point N, the piston will be at point A. The distance from A to B equals the piston stroke. Also the crank turns an angle of 180° while the cam rotates 90°. Therefore:—

$$(9) \quad R = \tfrac{1}{2}S$$
$$(10) \quad F = 2E$$

Where $R$ = crank length
$S$ = length of piston stroke = $s$
$F$ = angle of crank rotation
$E$ = angle of cam rotation.

The position, velocity, and acceleration of a piston moving with the crank motion shown in Figure 4 is given by the following equations:—

(11) $\quad x = R(1 - \cos F) - L(1 - \cos G) = R\left[1 - \cos F - \left(\dfrac{L}{R}\right) + \sqrt{\left(\dfrac{L}{R}\right)^2 - \sin^2 F}\right]$

(12) $\quad dx = RW(\sin F - \cos F \tan G)$

(13) $\quad d^2x = RW^2(\cos F - \dfrac{R \cos^2 F}{L \cos^3 G} + \sin F \tan G)$ Where $x$ = travel of piston from top center
$R$ = crank length
$L$ = length of connecting rod
$F$ = crank angle
$G$ = angle between connecting rod and $x$—$x$ axis
$dx$ = piston velocity
$W$ = constant angular velocity of crank
$d^2x$ = acceleration of piston.

When the piston is at $A$, then $x$, $F$ and $G = 0$, and $$d^2x_o = RW^2\left(1 - \dfrac{R}{L}\right)$$

When the piston is at $B$, then $$x = S, F = 180°, G = 0$$

$$d^2x_s = RW^2\left(1 + \dfrac{R}{L}\right)$$

From Equation (8)

$$d^2x_o = -\dfrac{b}{a}d^2x_s$$

Therefore $$RW^2\left(1 - \dfrac{R}{L}\right) = -\dfrac{b}{a}\left[-RW^2\left(1 + \dfrac{R}{L}\right)\right]$$

$$1 - \dfrac{R}{L} = \dfrac{b}{a}\left(1 + \dfrac{R}{L}\right)$$

(14) $\quad \dfrac{R}{L} = \dfrac{a-b}{a+b} = \dfrac{2R}{a+b}$

(15) $\quad L = \dfrac{a+b}{2}$

From Equation 15 it will be observed that the connecting rod length, which must be chosen to produce the desired piston motion so that the acceleration of the pistons will correspond to the acceleration in the connecting rod motion, should be equal to one half of $a+b$.

In designing the cam therefore, so that the pistons will have the acceleration curve indicated in Fig. 5, corresponding to the crank motion shown in Fig. 4, Formula (11) is used so that the values $x$ corresponding to the various angles of rotation of the cam are determined. This determines one quadrant of the cam which is tangent to the various roller circles located at the proper angular positions relative to the cam. In the case represented in Fig. 3 side MN is thus determined. Formula (4) then gives the values of $y$ corresponding to the different values of $x$ and by using this formula side RM is determined. Side NP is then made of the same shape as side MR and side PR made like side MN. The peripheral shape of the quadrant determined from the link motion will vary slightly but will correspond very closely to the quadrant first designed if the proper link motion is assumed, and the acceleration curve indicated in Fig. 5 from 0 to 90° will be closely approximated by the acceleration curve indicated from 90° to 180°.

In order to avoid abrupt changes in curvature of the acceleration curve, the cam is so designed that the inertia or acceleration force of the piston away from the cam persists through more than 90° of rotation of the cam. The term acceleration force of the piston is intended to define the force exerted by the piston due to its accelerational movements. If this is true the links will always operate under tension, and will never be stressed beyond a point which may be readily determined from the acceleration curve since the acceleration of a piston is subject to no abrupt changes. The vertical distance of the curve from the horizontal axis in Fig. 5 represents acceleration of piston A, from 0° to 180° displacement from the position indicated in dotted lines in Fig. 3. The slope of the curve at any point represents the rate of change of acceleration. The curve crosses the horizontal axis at about 55° displacement of the cam from the dead center position shown in Fig. 3. The acceleration force at the zero degree point, Fig. 5, bears the ratio of $\dfrac{b}{a}$ to the acceleration at the 90° point. With the acceleration curve gradually changing as indicated in Fig. 5, the cam will cause a freedom from vibration and from wear of the parts and will permit the use of a light link.

It will now be apparent that the gas pressure acting on the piston is transmitted by its piston roller directly to the cam and the only forces acting on the links are the inertia forces of piston and roller assemblies as they accelerate away from the cam. At no time is the driving force due to the gas pressure in the cylinder firing transmitted through the links between the pistons due to the flexibility of the interconnections between the pistons, and the cam design. As the acceleration of a piston away from the cam persists for a period exceeding 90° of cam rotation and its acceleration toward the cam (although greater in magnitude) extends through a period substantially less than 90° of cam rotation, there will always be at least two of the four pistons having inertia forces away from the cam, and at some interval during the rotation of the cam the inertia forces on all of the pistons will tend to be away from the cam. As long as there is a preponderance of inertia force away from the cam there will always be tension in the links, as the link stresses are equalized by the flexibility of the connections mentioned. Regardless of wear on the parts and resulting clearances the piston rollers are restrained to follow the cam outline even though there may be working clearance between the cam and the piston roller. The acceleration of the pistons being without abrupt change, the working clearances are not taken up suddenly and no hammering action exists between the cam and roller. No undue stresses are set up due to forces arising through acceleration of the piston assemblies and the parts are thus light in weight and capable of high-speed operation.

It is not essential that the pistons be given an acceleration corresponding to that produced in the crank motion, and the acceleration curve may be otherwise chosen, and other formulas than Formula (11) utilized, but the shape of this curve should be such that abrupt changes in acceleration are avoided by causing the outward inertia force of the pistons due to their acceleration, when they are operating upon the high sides of the cam, to persist through more than 90° of rotation of the cam if the best results are to be obtained.

I am aware that various modifications may be made within the scope of my invention and do not intend to be limited to the exact example which I have chosen for purposes of illustration.

I claim:

1. In a cam engine in which radially arranged interconnected pistons operate upon a central cam to cause revolution of a drive shaft, a cam having a peripheral shape which produces only gradual changes in acceleration of the pistons throughout the entire cycle of operation.

2. In a cam engine having pistons arranged to operate upon a central cam and having means interconnecting adjacent pistons, a cam having a peripheral shape which produces gradual changes in acceleration of a piston at the outer end of its stroke approximately equal to $\frac{b}{a}$ times the acceleration of the piston at the inner end of its stroke where $a$ and $b$ equal the distances along the piston axis between the point of connection of the piston at the outer and inner ends of its stroke respectively, to an adjacent piston, the acceleration of a piston being smooth and without abrupt change in any stroke of the piston.

3. In a cam engine having radially arranged piston assemblies arranged to operate upon a central cam to cause revolution of a drive shaft and links interconnecting adjacent piston assemblies, a cam having a peripheral shape to produce changes in acceleration in a stroke of a piston approximately the same as in a crank motion in which the connecting rod length is approximately $\frac{a+b}{2}$ where $a$ and $b$ equal the distance along the piston axis between the point of connection of a piston assembly at the outer and inner ends of its stroke respectively, to an adjacent piston assembly, the acceleration of a piston being smooth and without abrupt change in any stroke of the piston.

4. In a cam engine having radially arranged pistons arranged to operate upon a central cam to cause revolution of a drive shaft and having means interconnecting adjacent pistons, a cam having a peripheral shape which produces gradual changes in acceleration of the pistons throughout the entire cycle of operation, the cam producing changes in acceleration in a stroke of a piston approximately the same as in a crank motion in which the connecting rod length is $\frac{a+b}{2}$ where $a$ and $b$ equal the distances along the piston axis between the point of connection of a piston at the outer and inner ends of its stroke respectively, to an adjacent piston.

5. In a four-cylinder, four-cycle internal combustion engine in which four radially arranged link connected piston assemblies operate upon a central cam to cause revolution of the drive shaft, a double lobed cam having a peripheral shape which produces gradual changes in acceleration in a stroke of a piston approximately the same as in a crank motion in which the connecting rod length is $\frac{a+b}{2}$ where $a$ and $b$ equal the distances along the piston axis between the point of connection of a piston assembly at the outer and inner ends of its stroke respectively, to an adjacent piston assembly, the acceleration of a piston being smooth and without abrupt change in any stroke of the piston.

6. In an engine in which four link connected piston assemblies operate upon a central cam to cause revolution of the drive shaft, a double lobed cam having quadrants defined by the major and minor axes of the cam in which diagonally opposite quadrants are of exactly symmetrical form and adjacent quadrants of unsymmetrical form, one of said quadrants being formed to cause a motion of the piston substantially equivalent to that produced by a crank motion.

7. For use in a four-cylinder, four-cycle internal combustion engine in which four link connected piston assemblies operate upon a central cam to cause revolution of the drive shaft, a double lobed cam having quadrants defined by the major and minor axes of the cam in which diagonally opposite quadrants are of symmetrical form and adjacent quadrants of unsymmetrical form, the shape of the periphery of the cam being shaped to produce gradual changes in acceleration of the pistons throughout the entire cycle of operation.

8. In a four-cylinder, four-cycle internal combustion engine having four link connected piston assemblies arranged to operate upon a central cam to cause revolution of the drive shaft, a double lobed cam having quadrants defined by the major and minor axes of the cam in which diagonally opposite quadrants are of symmetrical form and adjacent quadrants of unsymmetrical form, the shape of the periphery of the cam producing gradual changes in acceleration in a stroke of a piston approximately the same as in a crank motion in which the connecting rod length is approximately $\frac{a+b}{2}$ where $a$ and $b$ equal the distance along the piston axis between the point of connection of a piston assembly at the outer and inner ends of its stroke respectively, to an adjacent piston assembly, the acceleration of a piston being smooth and without abrupt change in any stroke of the piston.

9. In a four-cylinder, four-cycle internal combustion engine having four link connected piston assemblies arranged to operate upon a central cam to cause revolution of the drive shaft, a double lobed cam having quadrants defined by the major and minor axes of the cam in which diagonally opposite quadrants are of symmetrical form and adjacent quadrants of unsymmetrical form, the shape of the periphery of the cam producing gradual changes in acceleration in a stroke of a piston approximately the same as in a crank motion in which the connecting rod length is approximately $\frac{a+b}{2}$ where $a$ and $b$ equal the distance along the piston axis between the point of connection of a piston assembly at the outer and inner ends of its stroke respectively, to an adjacent piston, said cam shape producing gradual changes in acceleration of the pistons throughout the entire cycle of operation.

10. For use in a cam engine in which radially arranged link interconnected pistons operate upon a central cam to cause revolution of the drive shaft, a cam having a peripheral shape which produces an inertia force of a piston away from the cam at the outer part of its stroke for more than 90° rotation of the cam.

11. In a cam engine in which radially arranged interconnected pistons operate upon a central cam to cause revolution of the drive shaft, a cam having a peripheral shape which produces an inertia force of a piston away from the cam at the outer part of its stroke for more than 90° rotation of the cam, the changes in acceleration of the pistons during a stroke being without abrupt change.

12. In a cam engine in which radially arranged interconnected pistons operate upon a central cam to cause revolution of the drive shaft, a cam having a peripheral shape which produces an inertia force of a piston away from the cam at the outer part of its stroke for more than 90° rotation of the cam, the changes in acceleration of the pistons adjacent the limits of their movement being without abrupt change.

13. The method of designing a cam for an engine in which link connected pistons operate upon a control cam to cause rotation of a drive shaft, comprising choosing the stroke and link lengths, choosing the acceleration changes desired in a stroke of a piston, designing one quadrant of the cam to cause such acceleration changes, duplicating the design for the diagonally opposite quadrant, and determining the shape of the remaining two quadrants from the link connection employed between the pistons.

14. The method of designing a cam for an engine in which link connected pistons operate upon a control cam to cause rotation of a drive shaft, comprising choosing the stroke length and link length determining the crank length of a crank motion necessary to produce acceleration changes desired, designing one quadrant of the cam as determined by its minor and major axes to produce such acceleration changes, duplicating the design for the diagonally opposite quadrant, and determining the shape of the remaining two quadrants from the link connection employed between the pistons.

In testimony whereof I have hereunto set my hand this 13th day of November, 1925.

HAROLD CAMINEZ.